July 29, 1969  R. E. DICK  3,457,653

AUTOMOBILE FRONT END ALIGNMENT EQUIPMENT

Filed May 19, 1964  2 Sheets-Sheet 1

INVENTOR.
ROY E. DICK
BY Pearce & Schaeperklaus
Attorneys

July 29, 1969  R. E. DICK  3,457,653
AUTOMOBILE FRONT END ALIGNMENT EQUIPMENT
Filed May 19, 1964  2 Sheets-Sheet 2
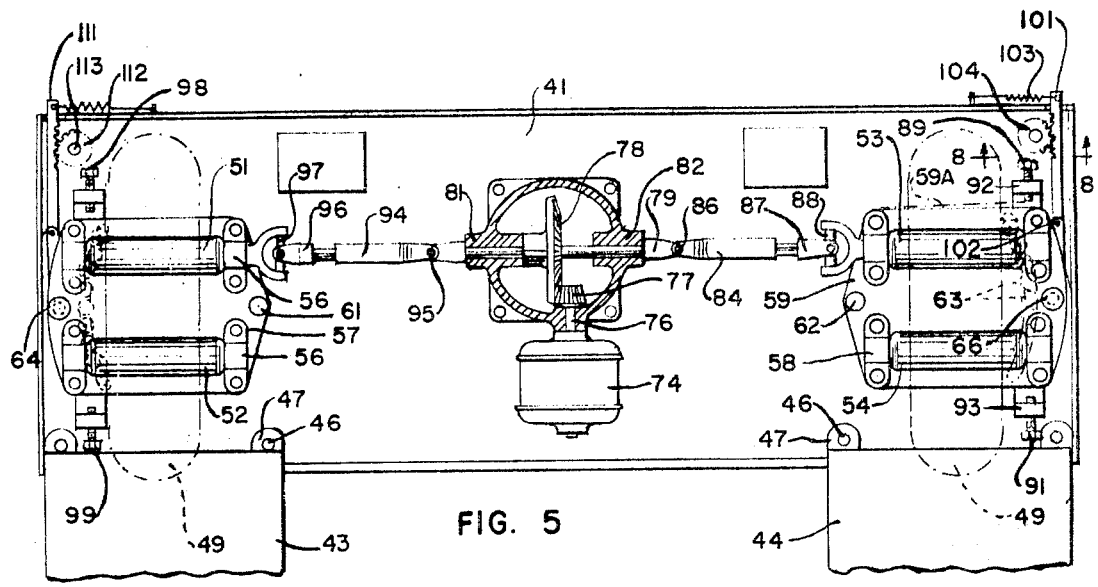
FIG. 5
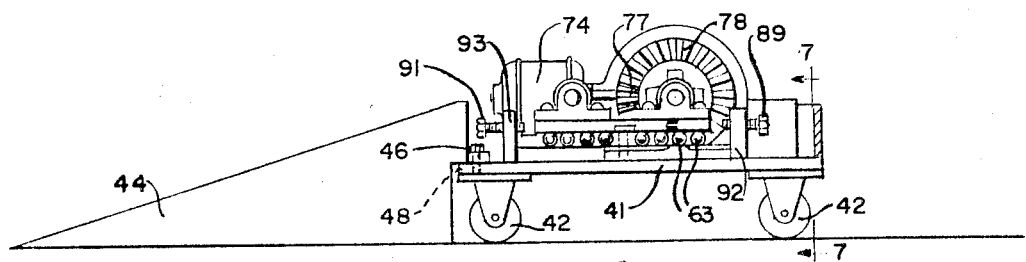
FIG. 6
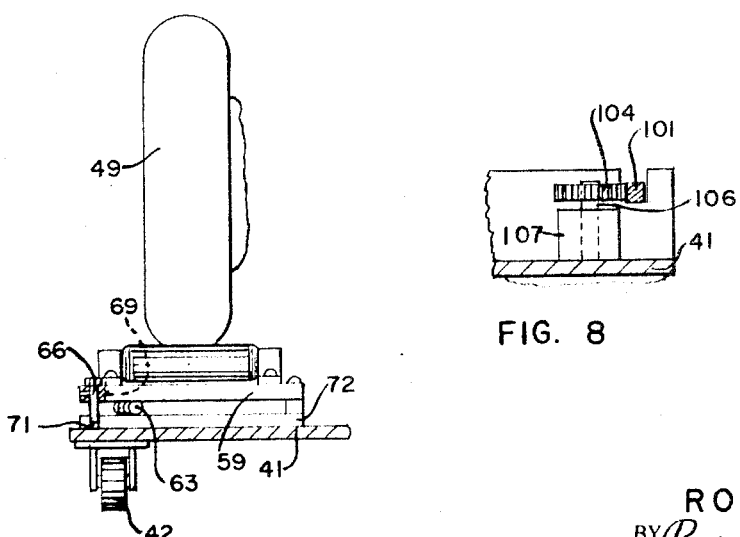
FIG. 7
FIG. 8
INVENTOR.
ROY E. DICK
BY Pearce & Schaeperklaus
Attorneys United States Patent Office 3,457,653
Patented July 29, 1969

3,457,653
AUTOMOBILE FRONT END ALIGNMENT
EQUIPMENT
Roy E. Dick, North College Hill, Ohio
(2010 Sundale Ave., Cincinnati, Ohio 45239)
Filed May 19, 1964, Ser. No. 368,460
Int. Cl. G01b 7/315
U.S. Cl. 33—203.13                                    4 Claims This invention relates to devices for aligning wheels of an automotive vehicle or the like. In particular, this invention relates to a device having electrically operated gauges which indicate the camber of wheels and the degree of toe-in or toe-out of the wheels of a vehicle.

An object of this invention is to provide a device which can be mounted on a wheel and which, upon adjustment in place on the wheel, indicates on a galvanometer the degree of camber of the wheel.

A further object of this invention is to provide such a device in which an upright column can be attached to a wheel and in which an indicator arm pivotally connected to the column can be adjustably swung to a horizontal position and, in which swinging of the adjustment arm actuates a potentiometer to cause registry on a galvanometer of a value determined by the degree of camber of the wheel.

A further object of this invention is to provide a device for measuring the degree of toe-in or out of a vehicle in which the wheels are positioned on rollers carried by carriages which can swing as the wheels are rotated and in which a linkage is connected to each carriage for operating a potentiometer, the reading of the potentiometers being determined by the degree of swinging of the carriage caused by the toe-in or toe-out of the wheels mounted thereon.

A further object of this invention is to provide such a device in which each carriage operates a rack which, in turn, drives a gear connected to one of the potentiometers for swinging or turning the potentiometer to a degree determined by the degree of swinging of the carriage and in which each potentiometer is connected to a galvanometer which provides readings indicating the degree of swinging of the carriage.

A further object of this invention is to provide such a device in which a motor drives rollers of the carriage to cause rotation of the wheels of the vehicle.

The above and other objects and features of the invention will be apparent to those skilled in the art to which this invention pertains from the following detailed description, and the drawings, in which:

FIG. 5 is a plan view of a portion of the device for determining the degree of toe-in or out of wheels; portions of ramps thereof being omitted, the operative position of tires on the wheels being shown in dot-dash lines, an alternate position of one of swinging carriages thereof being shown in dot-dash lines;

FIG. 6 is a view in side elevation of the portion of the device shown in FIG. 5, and portions driven by racks thereof and devices driven by the racks being omitted for clarity;

FIG. 7 is a view in section taken on the line 7—7 in FIG. 6;

FIG. 8 is an enlarged view in section taken on the line 8—8 in FIG. 5, and

In the following detailed description, and the drawings, like reference characters indicate like parts.

Figure 1:
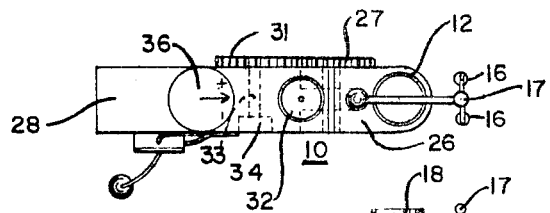
FIG. 1 is a plan view of a device for determining camber of a wheel, the device being constructed in accordance with an embodiment of this invention.
Figure 2:
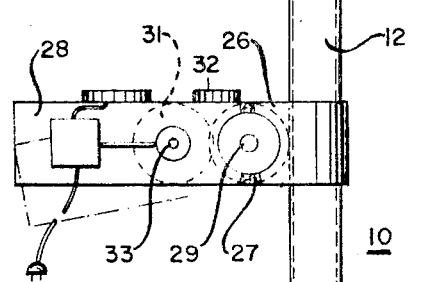
FIG. 2 is a view in side elevation of the device illustrated in FIG. 1 partly broken away and in section to reveal interior construction, an alternate position of an actuator arm thereof being indicated in dot-dash lines.
Figure 4:
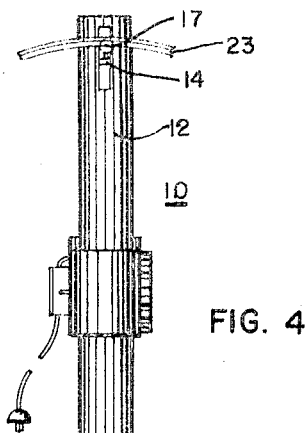
FIG. 4 is a view in section taken on the line 4—4 in FIG. 3.
Figure 3:
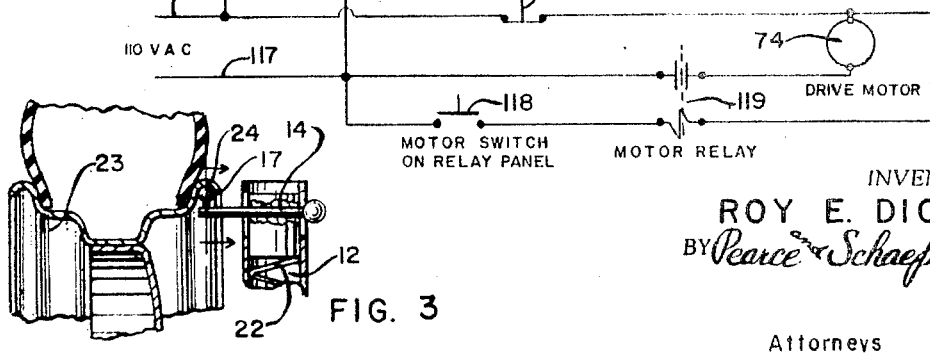
FIG. 3 is a fragmentary view in transverse section showing the device mounted on a wheel of a vehicle.

In FIGS. 1, 2, and 4 inclusive is illustrated a camber determining device indicated generally at 10, which forms a portion of an alignment determining device constructed in accordance with an embodiment of this invention. The device 10 includes an upright column or main bracket 12 on which is mounted a stationary bracket 13 and a movable bracket 14. The stationary bracket 13 carries a pair of ball members 16. The movable bracket 14 carries a single ball member 17. The movable bracket 14 includes a main bar portion or body 18 (FIG. 2) which extends through slots 19 and 21 in the column 12. A compression spring 22 urges the movable bracket to the FIG. 2 position. The column can be mounted in engagement with a wheel 23 of a vehicle, as indicated in FIGS. 3 and 4, with the ball members 16 and 17 engaging a rim portion 24 of the wheel. A hinge member 26 (FIGS. 1 and 2) is fixedly attached to the column 12 and carries a stationary gear 27 and the column is mounted with the hinge extending transversely of the wheel and the axis of the hinge substantially horizontal. An actuator arm 28 is pivotally mounted on a hinge pin 29 carried by the hinge member 26 and can swing between the position shown in full lines in FIG. 2 and a position shown in dot-dash lines in FIG. 2. A moving gear 31 is mounted in the actuator arm 28 in mesh with the stationary gear 27. A bubble level 32 (FIGS. 1 and 2) is mounted on the actuator arm 28 so that, as the actuator arm is swung between the positions illustrated in FIG. 2, the position at which the actuator arm 28 is horizontal can be determined from the bubble level 32. The moving gear 31 is mounted on and drives a shaft 33 on which a potentiometer 34 is mounted so that, as the actuator arm 28 is swung up or down, the movable contact of the potentiometer moves along the coil thereof. A galvanometer 36 is connected to the potentiometer and, as the movable contact of the potentiometer moves along the coil thereof, the reading of the galvanometer is varied, and the reading of the galvanometer indicates the degree to which the position of the column varies from the vertical, thus indicating the degree of the camber of the wheel. The electrical connections between the potentiometer 34 and the galvanometer 36 will be described in greater detail hereinafter in connection with the overall electrical circuitry of the device.

When the degree of camber of the wheel has been determined with the aid of the camber-determining device 10, any adjustments needed in the camber of the wheel can be can be made. Then, the camber-determining device can be removed from the wheel, and the vehicle is advanced onto an alignment platform 41 (shown in FIGS. 5 to 8, inclusive). The platform 41 is supported on wheels 42, which support the platform in substantial horizontal position. Ramps 43 and 44 can be attached to the platform 41 by means of pins 46. The pins 46 extend through ears 47, which are integral with the ramps, and are received in upright bores 48 (FIG. 6) in the platform 41. The ramps can guide wheels of a vehicle into position on mechanism carried by the platform at which tires 49 of the vehicle are shown in FIGS. 5 and 7. In this position, the tires are disposed on rollers 51, 52, 53 and 54 (FIG. 5). The rollers 51 and 52 are mounted in bearings 56 which, in turn, are mounted on a swinging carriage 57. The carriages swing parallel to the platform 41 and in substantially horizontal planes. Similarly, the rollers 53 and 54 are mounted in bearings 58 supported on a swinging carriage 59. The swinging carriage 57 is pivotally mounted on the platform 41 at a pivot 61. The swinging carriage 59 (FIG. 5) is similarly pivotally mounted on the platform 41 to swing about a pivot 62. The swinging carriages 57 and 59 are supported on bearings 63 so that the carriages can swing freely of the pivots thereof. However, removable lock pins 64 and 66 are provided for locking the swinging carriages 57 and 59, respectively, in centered position as the wheels are moved into and out of position on the rollers thereof. As shown in FIG. 7, the pin 66 extends through bores 69 and 71 in the swinging carriage 59 and a bearing supporting plate 72 respectively to lock the swinging carriage 59. Similarly the swinging carriage 57 can be locked by the pin 64.

When the wheels have been mounted on the rollers 51, 52, 53, and 54, the pins 64 and 66 are removed and the rollers and wheels are rotated by means of an electric motor 74. The motor 74 drives a motor shaft 76 which carries a bevel gear 77. The bevel gear 77 drives a mating bevel gear 78 which is mounted on a cross shaft 79 rotatably supported in bearings 81 and 82 mounted on the platform 41.

The cross shaft 79 drives the roller 53 through a drive chain which includes an internally splined shaft 84 hinged to the cross shaft 79 at a pivot pin 86 and an externally splined shaft 87 hinged to the roller 53 at a pivot pin 88. This drive chain permits the driving of the roller 53 by the motor 74 regardless of the position of the swinging carriage 59. The swing of the carriage 59 is limited by adjustable stop-screws 89 and 91 threaded in brackets 92 and 93, respectively. The brackets 92 and 93 are mounted on the platform 41, as shown in FIG. 6, and the swinging carriage engages the stop screws at the limits of its movement. Similarly, the roller 51 is driven by the cross-shaft 79 through a drive chain including an internally splined shaft 94 pivotally connected to the cross-shaft 79 at a pivot 95 and an externally splined shaft 96 pivotally connected to the roller 51 at a pivot 97. Adjustable stop screws 98 and 99 limit swinging of the carriage 57.

Figure 9:
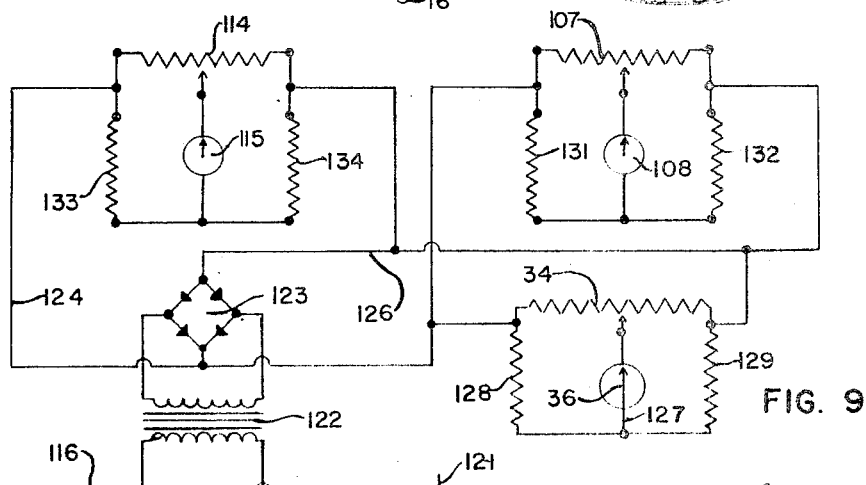
FIG. 9 is a schematic wiring diagram of the devices.

As the rollers 51 and 53 are rotated to turn the vehicle wheels, the swinging carriage can swing from the neutral position shown in full lines to a position such as that indicated in dot-dash lines at 59A, the amplitude of swinging being determined by the degree of "toe-in" or "toe-out" of the tire 49. As the swinging carriage 59 swings, a rack bar 101 moves transversely of the platform 41. The rack bar 101 is pivotally attached to the swinging carriage 59 at a pivot 102. A tension spring 103 holds the rack bar 101 with teeth thereof in mesh with teeth of a pinion 104. As shown in FIG. 8, the pinion 104 is carried by a shaft 106 which extends into and operates a movable contact of a potentiometer 107. As shown in FIG. 9, the potentiometer 107 is connected to a galvenometer 108 in such a manner that the reading of the galvanometer 108 indicates the degree to which the movable contact of the potentiometer is displaced incident to the swinging of carriage 59 (FIG. 5). Similarly, a rack bar 111, pivotally connected to the swinging carriage 57 drives a pinion 112 carried by a shaft 113. The shaft 113 drives the movable contact of a potentiometer 114 (FIG. 9). The potentiometer 114 is connected to a galvanometer 115 (FIG. 9), and the reading of the galvanometer 115 indicates the degree of displacement of the movable contact of the potentiometer 114 incident to swinging of the swinging carriage 57 (FIG. 5).

The electric circuitry of the device is shown in FIG. 9. Electric power is supplied through power leads 116 and 117. Operation of the drive motor 74 is initiated by closing of a motor switch 118 which energizes a motor starting relay 119. The motor can be stopped by opening a motor stop switch 121.

Power for the galvanometers and potentiometers is supplied through a transformer 122 and a rectifier 123 which supplies unidirectional current of appropriate voltage across leads 124 and 126. Coils of the potentiometers 34, 107 and 114 are connected across the leads 124 and 126. One lead of the galvanometer 36 is attached to a line 127 which is connected to the leads 124 and 126 through equal voltage dividing resistors 128 and 129, respectively, so that the line 127 is at a potential mid-way between the voltages of the leads 124 and 126. The movable contact of the potentiometer 34 is connected to the other side of the galvanometer 36 so that the galvanometer 36 has a zero reading when the movable contact of the potentiometer 34 is centered on the coil thereof, and displacement of the movable contact in opposite directions causes deflection of the indicator of the galvanometer 36 in opposite directions. In a similar manner, one lead of the galvanometer 108 is connected between voltage dividing resistors 131 and 132 connected to the leads 124 and 126 respectively, and the other lead of the galvaonometer 108 is connected to the movable contact of the potentiometer 107. The galvanometer 115 is similarly connected between voltage dividing resistors 133 and 134 which are connected to the leads 124 and 126, respectively, and to the movable contact of the potentiometer 114. Thus, each galvanometer registers the degree to which the movable contact to the potentiometer associated therewith is displaced from a zero reading. From the galvanometer 36 is determined the degree of the camber of a wheel. From the galvanometers 108 and 115 is determined the degree of toe-in or toe-out of the wheels, and from these readings can be determined the degree and type of adjustments required to correct alignment of the wheels.

The alignment indicating device illustrated in the drawings and described above its subject to structural modification.

Having described my invention, what I claim as new and desire to secure by letters patent is:

1. A device for indicating alignment of wheels of a vehicle when engaging only the treads of said wheels which comprises a platform, a pair of carriages mounted on said platform for swinging in substantially horizontal planes, a pair of rollers rotatably mounted on each carriage for supporting tires and wheels of the vehicle, means for unisonly rotating one of the rollers on each carriage for rotating the vehicle wheels thereon, a potentiometer connected to each carriage, a movable contact of each potentiometer being displaceable to a degree determined by the swing of the carriage associated therewith and a galvanometer connected to each potentiometer to register the degree of displacement of the movable contact thereof for indicating the swinging of the carriage associated therewith.

2. A device for indicating alignment of wheels of a vehicle when engaging only the treads of said wheels which comprises a platform, a carriage mounted on said platform for swinging in a substantially horizontal plane, a pair of rollers rotatably mounted on said carriage for supporting a tire and wheel of the vehicle, means for unisonly rotating one of the rollers on said carriage for rotating the vehicle wheel thereon, a potentiometer connected to said carriage, a movable contact of said potentiometer being displaceable to a degree determined by the swing of the carriage and a galvanometer connected to said potentiometer to register the degree of displacement of the movable contact thereof for indicating the swing of the carriage.

3. A device for indicating alignment of wheels; of a vehicle when engaging only the treads of said wheels which comprises a platform, a carriage mounted on said platform for swinging in a substantially horizontal plane, a pair of rollers rotatably mounted on said carriage for supporting a tire and wheel of the vehicle, a second pair of rollers rotatably mounted for supporting a second tire and wheel relative to said platform means for unisonly rotating one of each of said pairs of rollers for rotating the vehicle wheels thereon, a rack bar pivotally connected to the carriage, a pinion in mesh with the rack bar, a potentiometer connected to said pinion, a movable contact of said potentiometer being displaceable to a degree determined by the swing of the carriage and a galvanometer connected to said potentiometer to register the degree of displacement of the movable contact thereof for indicating the swing of the carriage.

4. A device for indicating alignment of wheels of a vehicle when engaging only the treads of said wheels which comprises a platform, a pair of carriages mounted on said platform for swinging in a substantially horizontal plane, a pair of rollers rotatably mounted on each carriage for supporting tires and wheels of the vehicle, means for rotating one of the rollers on each carriage for unisonly rotating the vehicle wheels thereon, a potentiometer connected to each carriage, a movable contact of each potentiometer being displaceable to a degree determined by the swing of the carriage associated therewith and galvanometer means connected to the potentiometers to register the degree of displacement of the movable contacts thereof for indicating the swing of the carriages associated therewith.

References Cited
UNITED STATES PATENTS

| | | | |
|---|---|---|---|
| 505,091 | 9/1893 | Chatillon | 177—230 |
| 1,967,139 | 7/1934 | Wilson | 33—203 |
| 2,581,630 | 1/1952 | Carrigan | 33—203 |
| 3,187,440 | 6/1965 | Merrill et al. | 33—203 |
| 2,562,142 | 7/1951 | Frazee | 33—203 |
| 2,627,123 | 2/1953 | Taber | 33—203 |
| 2,137,949 | 11/1938 | Phelps | 33—203 |
| 2,601,187 | 6/1952 | Volis | 33—203 |

WILLIAM D. MARTIN, JR., Primary Examiner

U.S. Cl. X.R.

33—203.18